3,573,152
THERMOPLASTIC ELONGATED CELLULAR PRODUCTS
Fred E. Wiley, Longmeadow, Mass., and Frederick D. De Bell, Hazardville, and John M. De Bell, Enfield, Conn., assignors to Foster Grant Co., Inc., Leominster, Mass.
Continuation-in-part of application Ser. No. 619,591, Jan. 27, 1967, which is a continuation of application Ser. No. 278,294, May 6, 1963, which in turn is a division of application Ser. No. 828,862, July 22, 1959, now Patent No. 3,121,130. This application July 29, 1969, Ser. No. 848,144
Int. Cl. B29h 7/20; B32b 5/12
U.S. Cl. 161—60
6 Claims

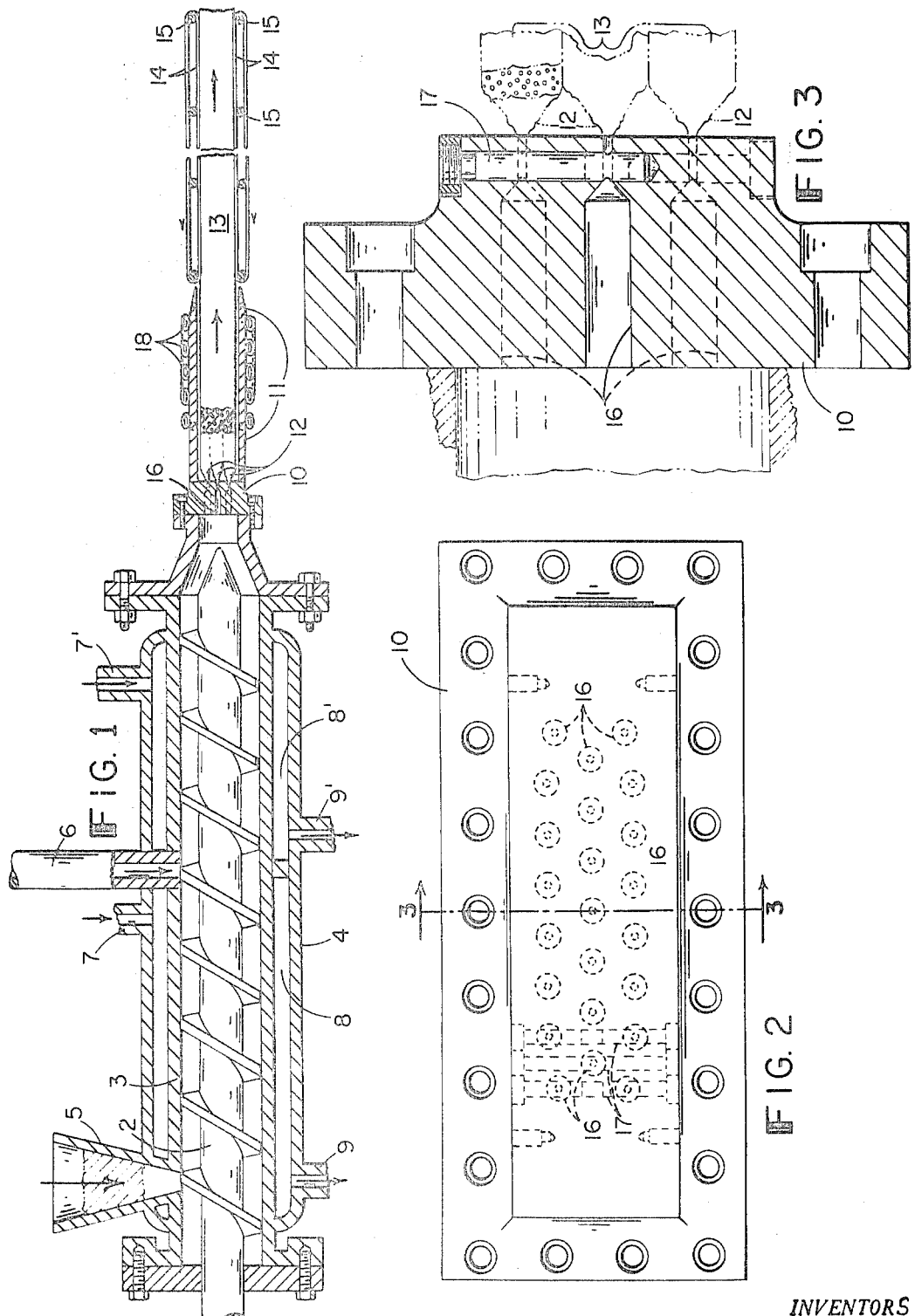

ABSTRACT OF THE DISCLOSURE

Integral foam objects composed of a plurality of fused strands having a density of 4 pounds per cubic foot or less are prepared by extruding a foamable thermoplastic material through a multi-orifice die plate whereby the individual foamable elements in strand form are simultaneously expanded and fused or coalesced upon emerging from the die orifices. Products of any desired configuration may be produced by placing a suitable former adjacent to the die. These foamable thermoplastic products may be polystyrene, polyethylene, or any of the known thermoplastics into which a non-solvent blowing or expanding agent is incorporated prior to extrusion.

---

This application is a continuation-in-part of U.S. patent application Ser. No. 619,591, filed Jan. 27, 1967, now abandoned, which is a continuation of application Ser. No. 278,294 filed May 6, 1963, now abandoned, which was a division of application Ser. No. 828,862 of Fred E. Wiley et al., filed on July 22, 1959, now issued as U.S. Pat. No. 3,121,130, and having the same assignee as this application.

This invention relates to cellular thermoplastic materials and products produced therefrom. In particular this invention is concerned with thermoplastic polymer and co-polymer products having a novel uniform cellular structure. More particularly, the invention is concerned with low density, foamed products of polystyrene, styrene co-polymers and polyethylene. The term low density in this application refers to expanded thermoplastic products having a density of 4.0 pounds per cubic foot (pcf.) or less.

The prior art recognizes low density (4.0 pcf. or less) thermoplastic cellular products, more commonly known as plastic foams, of two general classifications. The first class consists of thermoplastic products produced by the steam molding of discrete foamable particles in the form of expandable beads or pellets. This product is processed by the pre-expansion, usually on a continuous basis, by subjecting the particles containing a volatile blowing agent to a heated atmosphere. Agitation is maintained in the pre-expansion vessel and the residence time is controlled so as to prevent coalescense of the individual particles. The pre-expanded material has a density of approximately $\frac{1}{40}$ of that of the original unexpanded material, which is about 1.0 pcf. for expanded polystyrene. The pre-expanded particles are then placed in a closed vented mold and subjected to another heat treatment. Steam is usually injected into the mold at a pressure of approximately 15 lbs. per square inch; the pre-expanded particles undergo additional expansion and the individual particles coalesce into one mass having the shape of the mold. The products of this process have a structure characterized by substantially uniform, coalesced, polyhedral shaped particles approaching the shape of a sphere.

The other recognized low density product of the prior art is produced by the extrusion of a thermoplastic, a blowing agent, and normally a soap which is incorporated into the mixture in order to control viscosity. The product of this method is produced by extruding the latter mixture, termed a "gel" in the art, through a slit die. The resulting product is obtained in the form of a "log" which is then cut to the desired shape. The cellular structure of this product is characterized as a uniform material consisting of a multitude of finely divided thermoplastic cells. If this product is cut along a cross sectional plane, the structure is substantially uniform throughout the entire mass.

According to this invention, cellular thermoplastic products are produced by extruding a foamable thermoplastic material through a multi-orifice die in which the strands are at such a temperature and in such proximity to each other that the individual strands fuse or coalesce into a novel integral, strong uniform finished shape. There is no need to trim or cut the thermoplastic foam into the desired shape if a former is placed adjacent to the die.

The products of this invention may be produced by the process of U.S. Pat. 3,121,130. If the product of this instant invention is cut along a cross sectional plane, the coalesced strands from each orifice of the die plate are readily distinguishable. The product consists of a number of expanded thermoplastic strands arranged in a predetermined substantially parallel manner which coalesced as expansion took place. The internal structure of the coalesced strands consists of finely divided cells.

U.S. Pat. 2,818,905 of Simmonds et al. teaches a method whereby polyethylene is mixed with an organic compound which decomposes under the influence of heat. This mixture is extruded at a temperature of approximately 150° C. and an expanded thermoplastic foam is obtained. The partially expanded product of this extrusion is in the form of individual discrete expanded strands. The strands are then arranged in a bundle and wrapped in a thermoplastic envelope. This enveloped bundle of strands is then subjected to additional heat treatment and further expansion of the individual strands occurs. The individual strands coalesce into a foamed thermoplastic body having a density of approximately 20 lbs. per cubic foot. The product of this invention (U.S. Pat. 2,818,905) is not a low density expanded product.

The products of the present invention are distinguishable from the product of Simmonds et al. on the basis of the structural and other characteristics of the products. The polyethylene strands contained within the envelope as taught by Simmonds et al. must be heated to a temperature of approximately 125° C. to effect fusion of the strands into one mass. All thermoplastics, as is known in the art, are poor conductors of heat, and substantial destruction of the expanded thermoplastic cells occurs when the product of Simmonds et al. is given this post heat treatment. A great number of cells are destroyed due to the poor thermal conductivity of the thermoplastic, and the Simmonds et al. product has a density of approximately 20 lbs. per cubic foot. The coalesced strand product of Simmonds et al. is not a low density expanded product.

The products of the present invention are fused as expansion occurs; cell walls are not destroyed because no additional heat treatment is necessary to bond the individual strands into one mass. The problem of reheating is avoided by the novel process of U.S. Pat. 3,121,130 and a product of new structural characteristics is obtained. The expanded product although fused into one integral mass is composed of distinguishable strands of low density thermoplastic material. The low density is obtained because coalescence occurs almost simultaneously with formation of the expanded strand.

The coalesced strand structure of the product of this invention has the following advantages and distinguishing characteristics over the products of the prior art:

(a) the coalesced strand structure gives the product superior strength in the plane transverse to the direction of extrusion;
(b) the product may be extruded into a predetermined shape without any need to trim;
(c) the product has a low density combined with an integral structure consisting of distinguishable coalesced cellular strands; and
(d) the strand structure of this product may be arranged in any manner by varying the design of the extrusion die.

If the die orifices are spaced on a triangular pattern, high strength is obtained in both the direction transverse and parallel to the direction of extrusion. If the die orifices are positioned in a square pattern, the strength of the product is greater in the plane transverse to the extrusion direction.

If the extrusion die is properly designed by spacing the die orifices, it is possible to introduce planes of reduced strength into the product. These planes of reduced strength are useful, for example, in expanded board insulation. Various building structures require insulation boards of different widths. A workman can break the product of this invention along the planes of reduced strength to fit a particular structure. This eliminates the need for scoring operations that are presently used in the manufacture of insulation boards or manual trimming by the workman.

Extrusion methods are generally accepted as one of the most practical for production of foamed products. However, none of the known extrusion methods can be operated at low production rates in moderate size apparatus to produce products with a cross-sectional area large enough to be commercially desirable. Control of temperature and pressure and the rate at which they change is extremely important for the generation of good structures. If there is wide temperature variation over a cross section of the extrusion uneven foam, coarse bubbles, variable gravity, uncertain strength and variable heat insulation may result. The temperature at expansion must be low enough so that the extrudate has sufficient viscosity to produce a small cell structure.

The prior art has adopted many expedients to meet these needs. For example, U.S. 2,577,743, which teaches mixing polystyrene and blowing agent for hours and adds heavy soaps to adjust viscosity, discharges the mixture by batch process at the prodigious rate of 2,500 pounds an hour. To operate such a process continuously, which is not contemplated by the patent, it would have to run at the output of over 300 million board feet a year. The extrusion temperature of 100° C. does not allow much leeway in processing; and if the rate of extrusion is slowed, foaming would start back in the extruder. From the standpoint of economics and service over widespread markets, such a process has shortcomings.

The process of U.S. Pat. 2,450,436 is similarly restricted by several limitations. For example, the smallest linear dimension producible in this process must be at least two inches and must be extruded below the critical temperature of the blowing agent. Moreover, when the mass foams it must be cooled to a temperature not more than 10° above the heat distortion temperature of the polymer. Still another limitation is that the extrusion orifice must be an aperture of cross-sectional area corresponding to that of a circle of at least ¾-inch diameter. The process of U.S. Pat. 2,669,751 similarly is limited by considerations that the foamable material must pass through the mixing and cooling zones solely by pressure of the feed with no forwarding motion of the agitator and must have a temperature of 266° F. or lower at the point of extrusion and in some cases 230° F. or lower.

In accordance with the before mentioned objects of this invention, we have found that it is possible to produce novel foamed cellular bodies in any practical size in conventional or small sized equipment and with more freedom in choice of blowing or expanding agent. In particular, it is possible by the process of U.S. Pat. 3,121,130 to extrude desired shapes continuously and economically in conventional or small size equipment at controlled low production rates. As a result, the process enables the construction of small plants at advantageously situated market centers thereby avoiding the large central plants and high shipping costs entailed in shipping large bulk, low weight materials. In addition, economies are realized by the use of the lowest cost blowing agents under conditions hereinafter described.

Cellular thermoplastic products are produced continuously and economically by extruding a foamable material through multiple orifices into individual foamed elements at such a temperature and in such proximity that they fuse or coalesce into novel, integral, strong, uniform, finished shapes of this invention. The ability to use small production units situated near points of utilization, the employment of cheap blowing agents and the avoidance of high extrusion rates required in the aforesaid processes give the process of U.S. Pat. 3,121,130 unique, high commercial value.

In general, the objects of this invention are realized by extruding a foamable plastic material, e.g., polystyrene blended with a blowing or expanding agent, through a multiple orifice die plate. The polystyrene may be preblended with such an agent and used in the form of foamable beads or may be blended with the agent during processing as hereinafter described and illustrated in the drawings. Upon release of the plastic material through the multiple orifices, individual foamed elements in strand form are produced mainly as a result of the pressure drop across each orifice. Due to the proximity of the individual foamed strands as they expand, they fuse or coalesce into an integral, strong, uniform shape. By placing a suitable former adjacent to the die plate, articles of desired configuration can be produced in any length and cut as desired. In still another embodiment, a die plate having many individually valved orifices can be used to give almost any desired shape or contour by the predetermined selective adjustment of orifices. By placing a former corresponding in shape to the geometric arrangement of the open orifices, profiles of considerable complexity of cross-section can be produced.

It has further been found that the ultimate cross-section of a foam has a relation to the orifice from which it originates. For example, it has been noted that some foamable compositions from a $\frac{1}{16}''$ diameter orifice can expand to about $\frac{5}{8}''$ diameter. Based on this, it would be expected that the use of a $\frac{1}{2}''$ diameter orifice would yield at least a 5" diameter rod. However, this is not the case since it is found that such a large orifice will not maintain adequate pressure within the equipment unless the feed rate is greatly increased. While it is possible to use a reservoir for the foaming mixture and to release a large volume of material in a very short time through a larger orifice, thereby producing a log of desirable cross-section, such a reservoir is not commensurate with controlled, continuous operation. It is also seen that the multiple orifice concept upon which this invention is based leads to the important advantage of producing foams of a desired cross-section profile with little or no material waste. As a graphic illustration, use of multiple orifices in the manufacture of large slabs drastically reduces equipment size and capital requirements. Specifically, approximately 570 holes of 1/16" diameter can be used in the present process at a production rate of 570 pounds per hour to produce a slab with 4" by 48" cross-section. Conversely, a rate of 75,000 pounds per hour through a slot 0.3" by 40" would be required to produce a similarly dimensioned slab. The advantages in the use of multiple orifices over the single slit are thus readily appreciated.

We have also found it expedient when extruding at high temperatures, and before appreciably cooling the foamed shape beyond the former, to employ one or more endless belts to remove the foamed articles. As a result, the foamed article is kept straight and flat while cooling and a smoother surface is imparted thereto. Furthermore, by regulating the take off rate, sufficient back pressure can be transmitted to the point of foaming to insure coalescence of the individual strands.

This invention can be more readily appreciated by reference to the drawings wherein:

FIG. 1 is a side elevation in cross-section illustrating a conventional screw extruder with multiple orificed die plate, with foaming elements issuing into a former and being removed between endless belts;

FIG. 2 is a front elevational view of an orificed die plate having valve means;

FIG. 3 is a side elevation in section taken along the line 3—3 of FIG. 2;

Figure 4:
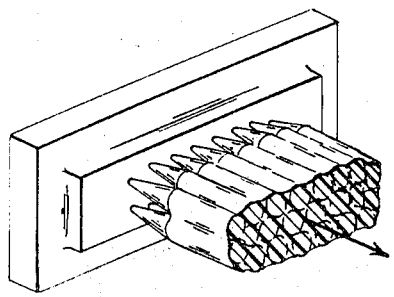
FIG. 4 is a perspective view of the multiple orificed die plate and individual foaming element issuing and swelling to coalesce into an integral shape.

In the drawing, the numeral 2 designates a feed screw in the cylindrical barrel 3 of a horizontal extrusion machine 4. Numerals 5 and 6 designate a polymer feed hopper and an expanding agent inlet, respectively. Jackets 8 and 8' function to control the extruder temperature and are provided with temperature control media inlet and outlet means 7 and 7' and 9 and 9' respectively. Multi-orificed die plate 10 is fastened to the forward or discharge end of the extruder. Former 11 is placed adjacent die plate 10 to receive and form the individual foamed elements 12 and is provided with temperature regulating means 18. Endless belts 14, driven by rolls 15, are arranged to remove the foamed product 13 as it leaves former 11.

Die plate 10, illustrated in larger detail in FIG. 2, may be provided with orifices 16 and valve means 17, which valves by proper adjustment operate to control the desired back pressure as well as the size on configuration of the foamed product 13. Valves 17 are further illustrated in FIG. 3.

Figure 5:
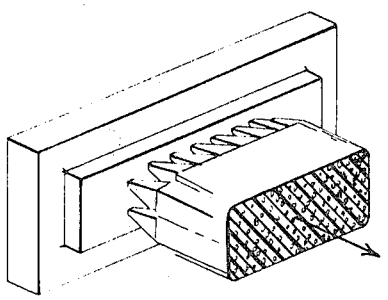
FIG. 5 is a perspective view of a square orificed die plate with foaming elements coalescing in a forming box.

FIG. 4 illustrates extrusion directly into the atmosphere through a die plate having round orifices while FIG. 5 illustrates extrusion through square holes into a former.

Figure 6:
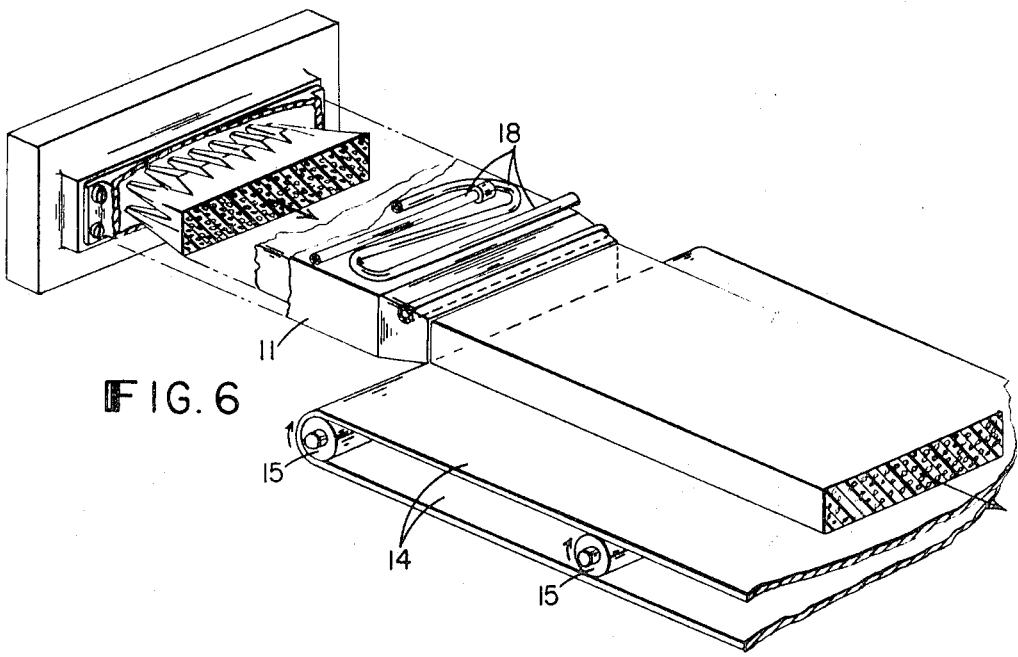
FIG. 6 is a perspective view with detailed sections of a round orifice plate, a slab former, an endless belt, and a cross section of the extruded, expanded, coalesced, foamed product illustrating graphically the individual, coalesced elements.

In producing cellular polystyrene by the process of U.S. Pat. 3,121,130 polystyrene is fed into extruder 4 through hopper 5, FIGS. 1 and 6, and mixed with an expanding agent fed through inlet 6. If foamable beads are used, inlet 6 is closed. The extruder is maintained at the required temperatures by means of heating or cooling media circulated through jackets 8 and 8' and the mix forwarded by motion of screw 2 towards die plate 10. Upon release of the mix through individual orifices 16, it expands as individual foamed elements or strands 12 which due to their proximity coalesce into an integral structure 13 as it passes through former 11. Former 11 may be provided with heating or cooling means 18 and conventional belts, as shown at 14, may be used to remove the foamed product.

While a rectangular former is illustrated, any desired forming device may be employed. Similarly, although not shown, the former may be of a clamping type which clamps about the extruded form, travels with it until it cools, opens and returns for a fresh bite. In the absence of a belt, the foamed product may be discharged or drawn from the die plate and former in any usual manner, e.g. by hand or other mechanical means, and in some cases the foaming pressure itself will extrude or push the product from the die plate. Similarly, while the foamed product is illustrated as a slab, it is obvious that by proper adjustment of the valving means 17, whereby orifices 16 may be completely or partially closed, shapes of any desired configuration may be continuously extruded and subsequently cut into any desired length or thickness. The issuing shape may also be pulled to stretch the plastic as it is freezing.

The amount of expanding agent employed depends upon the volume of gas it will generate and the foam density desired. In general, the weight percent of expanding agent, based on resin weight, will be in the range of 0.05 to 0.5 of its molecular weight, preferably about 0.2 to 0.3 of its molecular weight.

The blowing or expanding agents found suitable for making the products of this invention can be a gas which expands upon release of pressure to foam the plastic, a liquid which will vaporize to a gas and expand the plastic upon release of pressure, a solid which on decomposition releases a gas, e.g., an ammonium or azo type compound, or combinations of such gases, liquids, and solids. As examples of suitable normally gaseous agents there may be employed paraffins such as propane or butane or mixtures thereof, or cracked petroleum fractions. Similarly, olefins such as ethylene, propylene, butylene, etc., and mixtures thereof can be used. Suitable blowing or expanding agents include methyl chloride, higher paraffins such as pentane or hexane, Freons, water, etc. In addition, more permanent gases such as carbon dioxide, nitrogen or air can be employed. Ammonium and azo type compounds useful in the process include ammonium carbonate, ammonium bicarbonate, potassium bicarbonate, diazoaminobenzene, diazoaminotoluene, azodicarbonamide, diazoisobutyronitrile, etc.

EXAMPLE 1

A mixture composed of 91 parts by weight of a molding grade polystyrene and 9 parts of propane was extruded under 1000 p.s.i.g. pressure and at a temperature of 225° F. through a die plate containing 23 orifices, each 1/16" in diameter spaced approximately on 0.7 of inch centers into a rectangular former fastened to the die plate. A foamed board, 6" wide by 2" thick was produced at a continuous production rate of 27 pounds per hour. The product was a strong, uniform, integral finished structure of individually expanded, coalesced elements having a density of 2.1 pounds per cubic foot and was clear evidence of a novel and useful foamed product produced in small equipment at a continuous rate and well above the critical temperature of the propane expanding agent

EXAMPLE 2

Using the apparatus employed in Example 1 but with all 23 valved orifices being closed off approximately half to adjust the pressure precisely, a mixture composed of 89 parts by weight of a molding grade polystyrene and 11 parts by weight of butane was extruded under 650–700 p.s.i.g. pressure and at a temperature of 250–260° F. A foamed board having the dimensions of the product of Example 1 and a density of 1.7 pounds per cubic foot was produced at a continuous production rate of 27 pounds per hour. The product structure may be described as an integral, uniform expanded thermoplastic wherein the coalesced strands are distinguishable and arranged long the longitudinal axis in a substantially parallel manner.

EXAMPLE 3

A mixture composed of 89.7 parts by weight of polystyrene and 10.3 parts by weight of a gas mixture containing 65% butane and 35% propane was continuously extruded through a die plate having 6 orifices each 1/16" in diameter and into a rectangular former fastened to the die plate. The pressure drop across the orifices was 70 p.s.i.g. and the temperature at the die was approximately 260° F. A foamed board having a density of 1.6 pounds per cubic foot was continuously formed at the rate of 10 pounds per hour.

EXAMPLE 4

A mixture composed of 85 parts by weight of polyethylene and 15 parts by weight of Freon 114 (dichlorotetrafluoroethane) is continuously extruded through a die plate substantially in accordance with the procedure of Example 3. A thermoplastic cellular product having the novel characteristics of this invention is obtained.

The process of U.S. Pat. 3,121,130 may be employed in the production of novel cellular products of this invention from solid thermoplastic polymers and copolymers. Suitable polymers are the monovinyl aromatic hydrocarbons of the benzene series having the vinyl radical bonded directly to a carbon atom of the aromatic nucleus and nuclear halogenated derivatives thereof. Among such monovinyl aromatic compounds are styrene, vinyltoluene, vinylxylene, ethylvinylbenzene, para-chlorostyrene, meta-chlorostyrene, para-isopropylstyrene, para-bromostyrene, and ethylvinyltoluene. Copolymers of any two or more of such monovinyl aromatic compounds may also be used. The method may also be used in producing cellular products from thermoplastic resins such as polymethylmethacrylate, and copolymers of methylmethacrylate and styrene, or copolymers of styrene and alpha-methylstyrene. The method is also applicable to graft polymers and to polymers with which have been compounded other modifying agents, e.g. polystyrene containing a small amount of rubber. It is likewise suitable for other hydrocarbons, such as polyethylene, polypropylene, polyisobutylene and their mixtures.

The process of U.S. Pat. 3,121,130, as indicated above, is advantageously employed in the production of elongated cellular bodies, e.g. logs, planks, boards, etc. Most noteworthy is the avoidance of the narrow and critical operating conditions employed in the past. For example, in prior processes, use of a hydrocarbon blowing agent containing more than 4 carbon atoms requires foaming temperatures below the critical temperature of the blowing agent. No similar restriction is imposed by the present process on choice of temperature or blowing agent. Other prior conditions are dictated by the size of equipment used and the size of foam product desired. As a result, foams produced by a given process have characteristics with little possibility of variation. In sharp contrast, the process of U.S. Pat. 3,121,130 because of the flexibility permitted in the use of blowing agents and removal of limitations on operating temperatures, pressures, and throughout rates, allows production of foam types with a wide variety of predetermined physical properties. For example, it is possible by the present process to produce a rigid, friable foam or a resilient shock proof, somewhat softer foam. Additionally, by proper control of operating temperatures and pressures a highly oriented foam can be produced. It is also possible by means of the present invention to produce a novel foam possessing a high degree of flexibility. The latter may be illustrated by the following example:

EXAMPLE 5

Polystyrene containing a relatively high percentage of butane, in this case about 15% by weight, was extruded through the die plate employed in Example 2. The foam, having a density of 1.5 pounds per cubic foot, was allowed to cool and set before all of the blowing agent was spent. The cooled, set foam was then retreated at a low temperature in an atmospheric steam bath and it continued to expand slowly with the final release of blowing agent, its density dropping to 1.0 pound per cubic foot. Upon cooling, contraction of the gases caused the cell walls of the foam to partially collapse in a wrinkled, accordion fashion, and the initial density of 1.5 was attained. As a result, the microscopic folds in the cell walls impart high flexibility to the foam, quite unlike the usual rigid polystyrene foam.

While the foregoing examples illustrate the use of circular orifices, the invention is not limited thereto and includes within its scope the use of multi-orificed dies in which the orifices can have any single or combination of configurations such as slots, squares, holes, special shapes, etc.

With regard to orifice size, satisfactory operation has been realized with orifice openings as small as .02" diameter and, accordingly, the lower limit of orifice size appears to be limited only by machining costs and practicability. Preferably, orifices 1/16" to 1/8" diameter with adjustable valves for flow regulation are employed. However, larger orifices, e.g. 3/4", can be used but the economic advantage of producing large shapes with moderate throughput diminishes rapidly with increase in orifice size.

The products of this invention should desirably be formed from coalesced strands having an individual strand cross sectional dimension or diameter from about 0.2 to about 2 inches; preferably from about 0.5 to 1.3 inches. This preferred range of foamed strand diameter or cross sectional dimension gives a more homogeneous product, promotes stronger bonding of the coalesced strands and greater overall product strength.

In still another embodiment of this invention, foamed products of predetermined shape have been extruded and color decorated in predetermined areas simultaneously. Although it is, of course, possible to extrude a foamed product of one uniform color, it is not possible to obtain a multi-colored effect in the same manner. Multi-colored effects can now be obtained in foamed products by metering dyes or pigments through the valve means to each strand as it is extruded. In this manner, various dyes or pigments are introduced into each strand as desired and a predetermined colored effect is obtained with little or no running together of colors. Individually colored foamed elements running longitudinally within the foamed structure at predetermined locations give predetermined axially continuous colors, and when cut transversely to a desired thickness gives finished, colored articles. To illustrate, colored products including Christmas decorations, toy animals, store and window display devices and the like are produced by this method.

The new and novel extruded foams of this invention have unique properties. Whereas foams produced by the usual extrusion methods are not resilient and crush easily under the drop ball testing method, the present foams are highly resilient and resistant to crushing.

The novel products of this invention find a wide field of use. For example, these foams are being used as perimeter insulation for cold rooms, concrete floors, and truck bodies. In addition, the foams find use in flotation devices, other buoyant applications and plaster base and industrial roofing insulation. The uncolored, colored and color patterned foam products of this invention have application in packaging, floral and display uses, toys, novelties, etc.

What is claimed is:

1. A thermoplastic elongated cellular body of a density from about 1 to about 4 pounds per cubic foot, comprising a plurality of coalesced, distinguishable expanded strands, said expanded strands being disposed in substantially parallel arrangement to the longitudinal axis of the cellular body.

2. A product of claim 1 wherein the coalesced strands have an individual strand cross sectional dimension from about 0.2 to about 2 inches.

3. A product of claim 1 wherein the thermoplastic is a polystyrene.

4. A product of claim 1 wherein the thermoplastic is polyethylene.

5. The product of claim 1 wherein at least one of said strands has a colorant dispersed therethrough.

6. A product of claim 1 wherein the coalesced strands have an individual strand cross sectional dimension from about 0.5 to about 1.3 inches.

References Cited
UNITED STATES PATENTS

| | | | |
|---|---|---|---|
| 2,576,977 | 12/1951 | Stober | 260—2.5 |
| 2,795,008 | 6/1957 | Lindemann et al. | 264—54 |
| 2,818,905 | 1/1958 | Simmonds et al. | 156—50 |
| 3,026,274 | 3/1962 | McMillan et al. | 260—2.5 |

ROBERT F. BURNETT, Primary Examiner

R. L. MAY, Assistant Examiner

U.S. Cl. X.R.

161—142, 168